United States Patent
Kram et al.

(10) Patent No.: US 8,183,809 B2
(45) Date of Patent: May 22, 2012

(54) DRIVE DEVICE FOR AT LEAST ONE ELECTRIC MOTOR AND DRIVE CONTROL UNIT INTERACTING WITH THE DRIVE DEVICE

(75) Inventors: Raimund Kram, Erlangen (DE);
Rolf-Dieter Pavlik, Erlangen (DE);
Bernd Quaschner, Grossenseebach (DE)

(73) Assignee: Siemens Aktiengesellschaft, München (DE)

( * ) Notice: Subject to any disclaimer, the term of this patent is extended or adjusted under 35 U.S.C. 154(b) by 426 days.

(21) Appl. No.: 12/518,740

(22) PCT Filed: Dec. 14, 2007

(86) PCT No.: PCT/EP2007/063949
§ 371 (c)(1),
(2), (4) Date: Jun. 11, 2009

(87) PCT Pub. No.: WO2008/074736
PCT Pub. Date: Jun. 26, 2008

(65) Prior Publication Data
US 2010/0001676 A1    Jan. 7, 2010

(30) Foreign Application Priority Data
Dec. 18, 2006  (DE) .................. 10 2006 059 708

(51) Int. Cl.
*G05B 5/00*  (2006.01)

(52) U.S. Cl. ............. 318/452; 318/565; 318/490
(58) Field of Classification Search ............. 318/452, 318/565, 490, 282; 701/149
See application file for complete search history.

(56) References Cited

U.S. PATENT DOCUMENTS

| | | |
|---|---|---|
| 5,473,497 A | 12/1995 | Beatty |
| 2006/0072265 A1 | 4/2006 | Bucella et al. |
| 2009/0091285 A1* | 4/2009 | Hahn et al. ............. 318/565 |

FOREIGN PATENT DOCUMENTS

RU          2 192 698 C1     11/2002

* cited by examiner

*Primary Examiner* — Karen Masih

(57) ABSTRACT

A drive device for an electric motor is provided. The drive device decides based on signals it receives from outside whether it is monitoring an actual value of the electric motor with respect to the adherence to an actual value condition (monitoring operation). During monitoring operation, the drive device causes the motor to be disconnected from a power supply if the actual value does not adhere to the actual value condition. Via a communication connection, the drive device provides a drive control unit with first information, which reveals whether the drive device is in the monitoring operating mode. The drive device provides the drive control unit with second information, which reveals what the actual value condition is. Based on the first information, the drive control unit examines whether the drive device is in the monitoring operating mode. If this is the case, the drive control unit, based on the second information, determines what the actual value condition is.

20 Claims, 8 Drawing Sheets

DRIVE DEVICE FOR AT LEAST ONE ELECTRIC MOTOR AND DRIVE CONTROL UNIT INTERACTING WITH THE DRIVE DEVICE

CROSS REFERENCE TO RELATED APPLICATIONS

This application is the US National Stage of International Application No. PCT/EP2007/063949 filed Dec. 14, 2007 and claims the benefit thereof. The International Application claims the benefits of German Patent Application No. 10 2006 059 708.7 DE filed Dec. 18, 2006, both of the applications are incorporated by reference herein in their entirety.

FIELD OF INVENTION

The present invention relates to a drive device for at least one electric motor that is operated as follows:
   On the basis of a sequence of setpoint values determined for the electric motor and corresponding actual values the drive device determines current setpoint values for the electric motor. The setpoint values are made available to the drive device by a higher-level drive control unit via a communication link. The drive device either makes the current setpoint values available to a drive unit for the electric motor or on the basis of the current setpoint values and corresponding current actual values determines trigger signals for a number of circuit-breakers and supplies the trigger signals to the circuit-breakers. By means of the circuit-breakers the electric motor is connected in accordance with the respective current setpoint value to a power supply.
   On the basis of first signals supplied from outside to the drive device, the drive device decides whether it is monitoring an actual value of the electric motor for compliance with an actual-value condition (monitoring mode).
   In the monitoring mode the drive device automatically causes the electric motor to be disconnected from the power supply if the actual value does not comply with the actual-value condition.

The present invention further relates to a computer program comprising machine code, the execution of which by means of a drive device for at least one electric motor causes the drive device to be operated in the manner described above. The present invention also relates to a data carrier on which such a computer program is stored.

The present invention also relates to a drive control unit that is operated as follows:
   On the basis of an application program and/or on the basis of inputs of a user, the drive control unit determines a first sequence of setpoint values for at least a first electric motor.
   The drive control unit makes at least the first sequence of setpoint values available to a first lower-level drive device via a communication link.
   The drive control unit checks whether the first drive device is monitoring an actual value of the first electric motor for compliance with an actual-value condition.
   If the first drive device is monitoring the actual value of the first electric motor for compliance with the actual-value condition, the drive control unit determines the first sequence of setpoint values while taking account of the actual-value condition.

The present invention further relates to a computer program comprising machine code, the execution of which by means of a drive control unit for at least a first electric motor causes the drive control unit to be operated in the manner described above. The present invention also relates to a data carrier on which such a computer program is stored.

BACKGROUND OF INVENTION

Drive devices and drive control units of the type described above are generally known. The drive control units generally take the form of motion control devices, in particular as numerical control units for machine tools or motion control units for production machines. The sequences of setpoint values that are communicated from the drive control units to the corresponding drive devices are generally sequences of position- or rotational speed setpoint values. In individual cases, however, the determination of torque- or other setpoint values is also possible.

The drive devices are conventional motor control devices. They convert the determined position-, rotational speed-, torque- or other setpoint values at least into current setpoint values. In many cases, the drive devices themselves directly trigger their electric motors. In other cases, they communicate the current setpoint values to a lower-level device, which effects determination of the trigger signals for circuit-breakers and triggering of the circuit-breakers.

During normal operation the drive device carries out only the conversion of the communicated sequence of setpoint values into the current setpoint values but does not carry out any monitoring tasks with regard to the electric motor. In many operating states, however, it is necessary for the electric motor to be controlled in a specific manner and also monitored. For example—depending on the operating situation—one of the following requirements may exist:
   The electric motor is to be decelerated to zero rotational speed and then actively held at a standstill.
   The rotational speed of the electric motor is to be lowered until it is below a maximum permissible rotational speed.
   The motor is to be operated only in a specific direction of rotation. This mode of operation may be important particularly if there is a risk of a so-called pull-through load.
   The motor is to be operated at most with a torque limit.
   The electric motor is to be brought to a standstill and then de-energized. Optionally an interaction with a mechanical brake may occur.
   Other requirements may also exist.

Such monitoring operations are conventionally carried out by the drive device. If the electric motor in the monitoring mode of the drive device does not comply with the required operating condition, it is disconnected from the power supply by the drive device. A braking device, in particular a mechanical brake, may possibly also be actuated.

Whether the electric motor is to be monitored by the drive device and the possible nature of the monitoring is decided by the drive device on the basis of corresponding safety-related signals that are supplied from outside to the drive device. Parameters that more closely define the state to be monitored may also be supplied from outside to the drive device. Thus for example the maximum permissible rotational speed value, the desired direction of rotation or the maximum permissible torque value may be supplied to the drive device.

From the above, purely exemplary list of monitoring operations it is clear that for many monitoring operations the electric motor even after initiation of the monitoring mode may continue to remain connected to the power supply. In the framework of the present invention only such states are of importance. So long as in such monitored states the actual value of the electric motor complies with the actual-value condition, the electric motor remains connected to the power supply and is operated in accordance with the current setpoint values determined by the drive device. It is only if the electric motor breaches the actual-value condition that the drive device automatically causes the electric motor to be disconnected from the power supply. The drive device—speaking metaphorically—pulls the emergency brake.

Within the framework of selection of the setpoint values by the drive control unit, as a rule a management of the electric motor occurs. The time sequence of setpoint values is therefore determined by the drive control unit while simultaneously taking into account the dynamics of the electric motor—possibly also while taking into account a load actuated by the electric motor—in such a way that the electric motor may follow the corresponding setpoint selection. If the monitoring mode is initiated, the appropriate information therefore generally has to be supplied not only to the drive device but also to the drive control unit. In the prior art various procedures for this purpose are known.

Thus for example it is known to transmit the first signals via a fail-safe programmable controller to the drive device. In this case, three embodiments are known.

Firstly, it is known for the first signals to be communicated by the fail-safe programmable controller not only to the drive device but also to the drive control unit. Secondly, it is known for the drive control unit alternatively passively to listen in on the data traffic from the fail-safe programmable controller to the drive device. Thirdly, it is possible for the drive device to output the first signals and for the first signals to be supplied via an intrinsic terminal module directly to the drive control unit. This means that this supplying has to be effected in addition to the supplying of the first signals to the drive device.

It is further known for the first signals to be supplied directly via a terminal module to the drive device. In this embodiment it is known to associate an intrinsic terminal module with the drive control unit. The signals supplied to the drive control unit may in this case alternatively directly be the first signals or signals for output that are determined by the drive device on the basis of the first signals.

SUMMARY OF INVENTION

An object of the present invention is to provide a further facility, by means of which the relevant information for the monitoring mode (monitoring mode yes or no and actual-value condition to be monitored) may be made known in a simple and reliable manner to the drive control unit.

In device terms, the object is achieved by a drive device and by a drive control unit as claimed in the claims.

According to the invention the drive device, via the same communication link by which the sequence of setpoint values is made available to the drive device by the higher-level drive control unit, makes available to the drive control unit first information, which reveals whether the drive device is in the monitoring mode. At least in the monitoring mode the drive device, via the same communication link, makes available to the drive control unit second information, which reveals the nature of the actual-value condition.

In program terms, the object is achieved by computer programs comprising machine code, the execution of which by means of a drive device for at least one electric motor and/or a drive control unit for at least a first electric motor causes the drive device and/or the drive control unit to be operated in the manner described above. The object is also achieved by data carriers, on which the corresponding programs are stored.

As already mentioned, the sequence of setpoint values is often a sequence of position- or rotational speed setpoint values. Furthermore, the actual-value condition in many cases is compliance with a rotational speed limit by the electric motor and/or rotation of the electric motor in a setpoint direction of rotation.

In many cases the drive control unit also determines, on the basis of the application program or the inputs of the user, a second sequence of setpoint values for at least a second electric motor. The second sequence of setpoint values in many cases is of the same type as the first sequence of setpoint values. In the case of both the first sequence of setpoint values and the second sequence of setpoint values, they are for example rotational speed setpoint values. Also, in the case of both sequences of setpoint values, they may be position setpoint values or torque setpoint values. The drive control unit makes the second sequence of setpoint values available either to the first drive device (if this can also control the second electric motor) or to a second drive device. The drive control unit in such cases determines the sequences of setpoint values in a coordinated manner. This coordination is carried out in particular independently of whether or not the drive device is in the monitoring mode. According to the invention therefore the drive control unit, in the situation where the first drive device is monitoring the first electric motor for compliance with the actual-value condition, also determines the second sequence of setpoint values while simultaneously taking into account the actual-value condition that actually applies only to the first electric motor.

It is possible for the actual-value condition to be variable with time and/or parameterizable on the basis of second signals supplied from outside to the drive device. For example the value that the maximum permissible rotational speed is to have may be supplied from outside to the drive device. The supplying of this value may be effected for example by means of a user input. The supplying of the value by another component is also possible. The time characteristic of the actual-value condition may for example be determined—whether on the basis of external inputs or on the basis of internal parameterizations—in particular while simultaneously taking into account the actual values existing at the time of changing to the monitoring mode. For in particular a change of rotational speed for example can be effected only within a limited time, not however indefinitely quickly.

The first information and the second information are present in the drive device. The storage location inside the drive device is in principle variable at will. Preferably however the drive device stores the first and the second information in a contiguous data storage area of the drive device. In the situation where the drive device controls a plurality of electric motors, preferably the first and the second information for each of these motors is stored in the contiguous data storage area.

In the situation where the drive device stores the first and the second information in a contiguous data storage area of the drive device, it is possible for the drive device to allow the drive control unit at least read access to the contiguous data storage area. In this case, the drive control unit reads out the information from the data storage area of the drive device.

Independently of the form in which the drive device stores the information internally, it is alternatively possible for the drive device to communicate the first and the second information to the drive control unit. In this case, the drive control unit accepts the information from the drive device.

As an alternative to communication or acceptance of the information, it is possible for the drive device to write the first and the second information into a contiguous data storage area of the drive control unit. In this case, the drive control unit allows the drive device the appropriate write access and reads out the information from the contiguous data storage area of the drive control unit.

BRIEF DESCRIPTION OF THE DRAWINGS

Further advantages and details emerge from the following description of embodiments in conjunction with the drawings. These show in schematic representation:

FIG. 1-3 drive arrangements,
FIG. 4-7 flowcharts,
FIG. 8 a motor control device with a data storage area,
FIG. 9-11 possible ways in which information can be made available, and
FIG. 12 a flowchart.

DETAILED DESCRIPTION OF INVENTION

Figure 1:
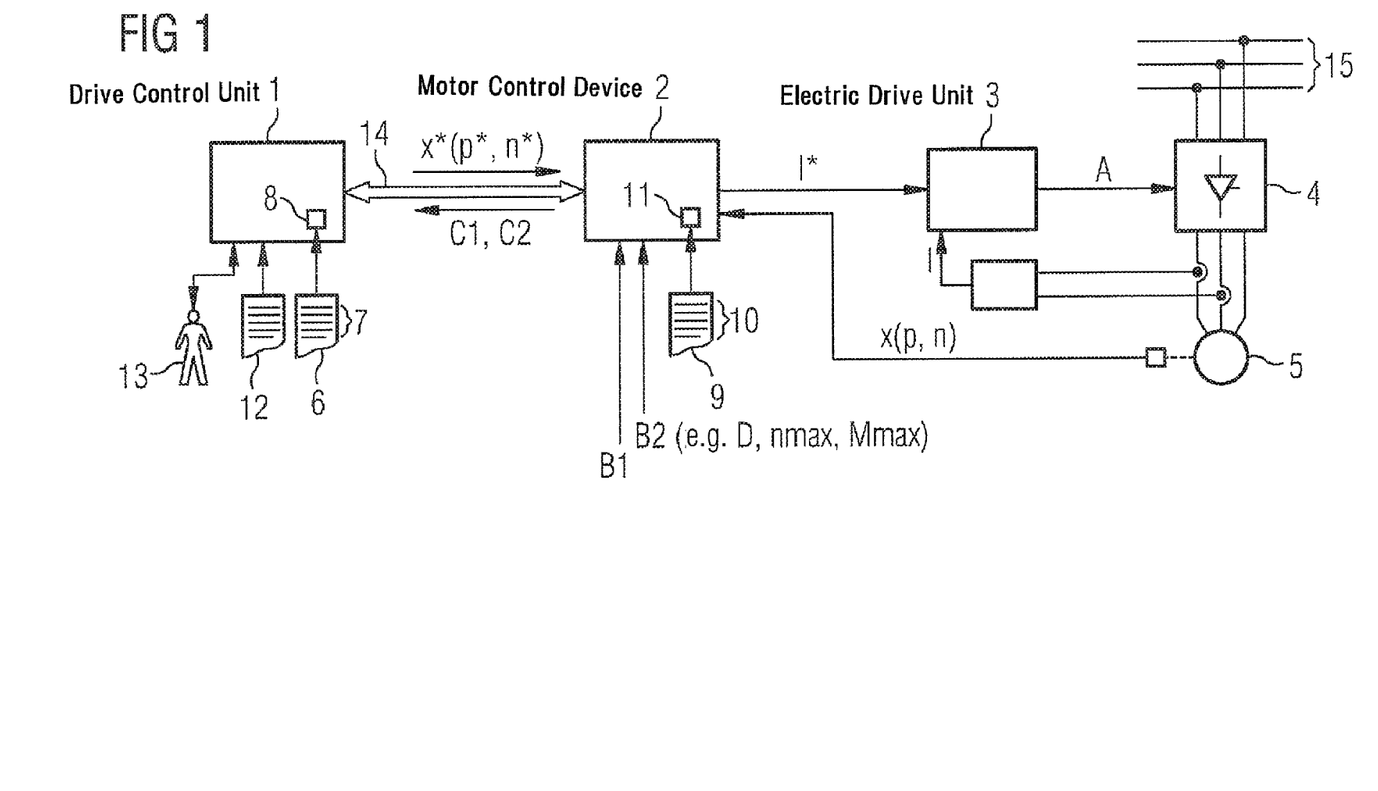

According to FIG. 1 a drive arrangement comprises a drive control unit 1, a motor control device 2, an electric drive unit 3, a number of circuit-breakers 4 and an electric motor 5.

The drive control unit 1 generally takes the form of a software-programmable device. During operation it processes a computer program 6 comprising machine code 7. The execution of the machine code 7 by the drive control unit 1 has the effect that the drive control unit 1 is operated in the manner described below.

The computer program 6 has to be stored in an internal memory 8 of the drive control unit 1. The internal memory 8 of the drive control unit 1 corresponds to a data carrier in the sense of the present invention.

To program the drive control unit 1 the computer program 6 has to be generated and supplied to the drive control unit 1. Within the framework of generation of the computer program 6 there is possibly temporary storage on another data carrier. This other data carrier also corresponds to a data carrier in the sense of the present invention. Thus for example it is possible for the computer program to be temporarily stored in a mobile storage device, for example in a USB memory stick or a memory card. Alternatively, it is possible for example for the computer program 6 to be stored in a bulk storage device of an external computer and supplied to the drive control unit 1 via a computer-to-computer link. A typical example of a computer-to-computer link is the internet or a LAN.

The motor control device 2 corresponds to a minimal configuration of a drive device in the sense of the present invention. It is subordinate to the drive control unit 1. The motor control device 2 may be an independent device. Alternatively the motor control device 2 may be combined with the electric drive unit 3 or with the electric drive unit 3 and the circuit-breakers 4 into a unit. In this case the unit corresponds to a drive device in the sense of the present invention.

In the following it is assumed that the motor control device 2 corresponds to the drive device of the present invention. However, as already mentioned, this assumption is not limiting.

The motor control device 2 also generally takes the form of a software-programmable device. During operation it processes a computer program 9 comprising machine code 10. Execution of the machine code 10 by the motor control device 2 causes the motor control device 2 to be operated in the manner described below.

The computer program 9 has to be stored in an internal memory 11 of the motor control device 2. The internal memory 11 of the motor control device 2 corresponds to a data carrier in the sense of the present invention. With regard to generation of the computer program 9 and supplying the computer program 9 to the motor control device 2 the above explanations regarding generation of the computer program 6 for the drive control unit 1 and supplying the computer program 6 to the drive control unit 1 apply analogously.

Should the electric drive unit 3 be an independent device, i.e. not be integrated in the motor control device 2, the electric drive unit 3 is also generally software-programmable. This is however of secondary importance within the framework of the present invention. For this reason, this is not described in detail below.

The components 1 to 5 of the drive arrangement of FIG. 1 interact during normal operation as follows:

On the basis of an application program 12 and/or on the basis of inputs of a user 13 the drive control unit 1 determines a sequence of setpoint values $x^*$ for the electric motor 5. These setpoint values $x^*$ may be in particular position setpoint values $p^*$ or rotational speed setpoint values $n^*$—see FIGS. 2 and 3.

Figure 2:
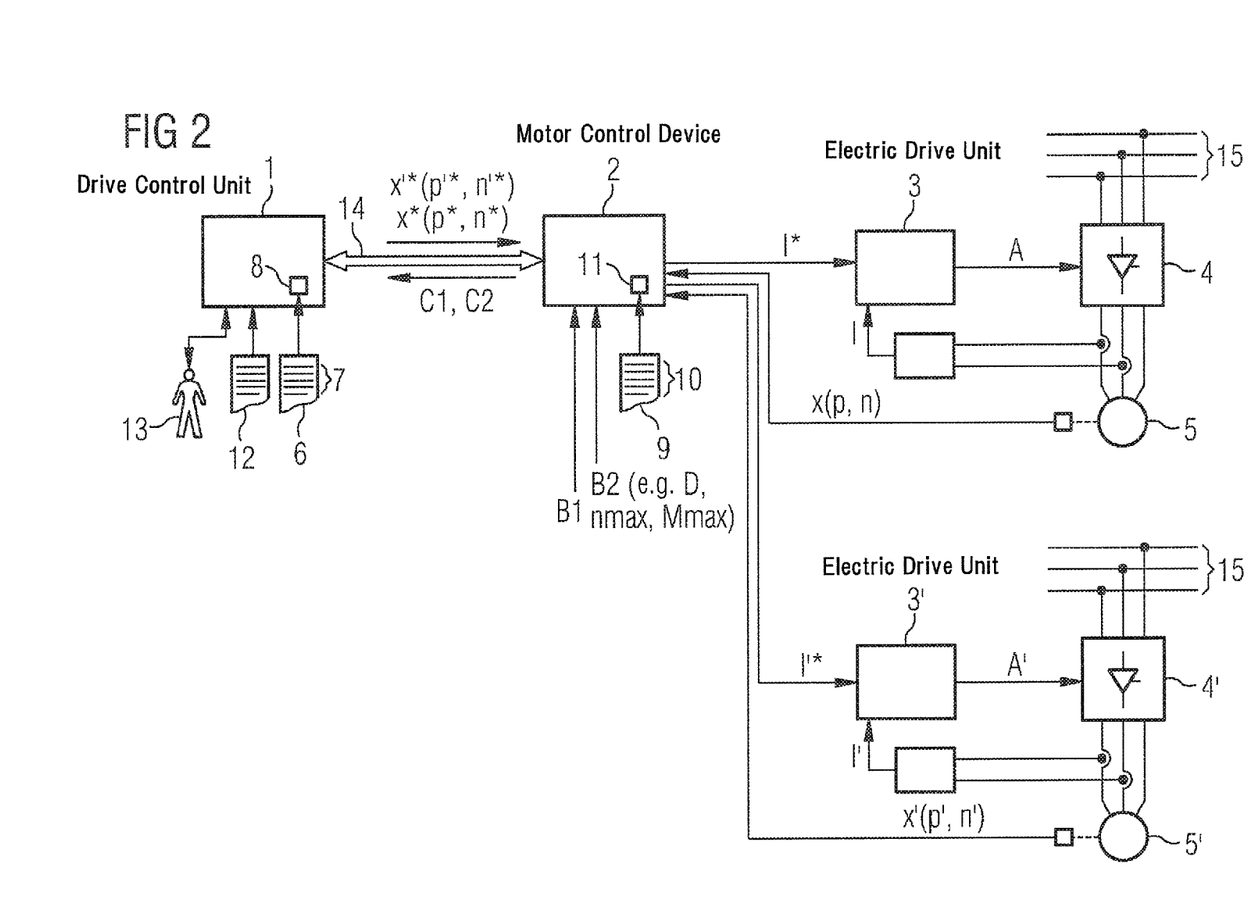
Figure 3:
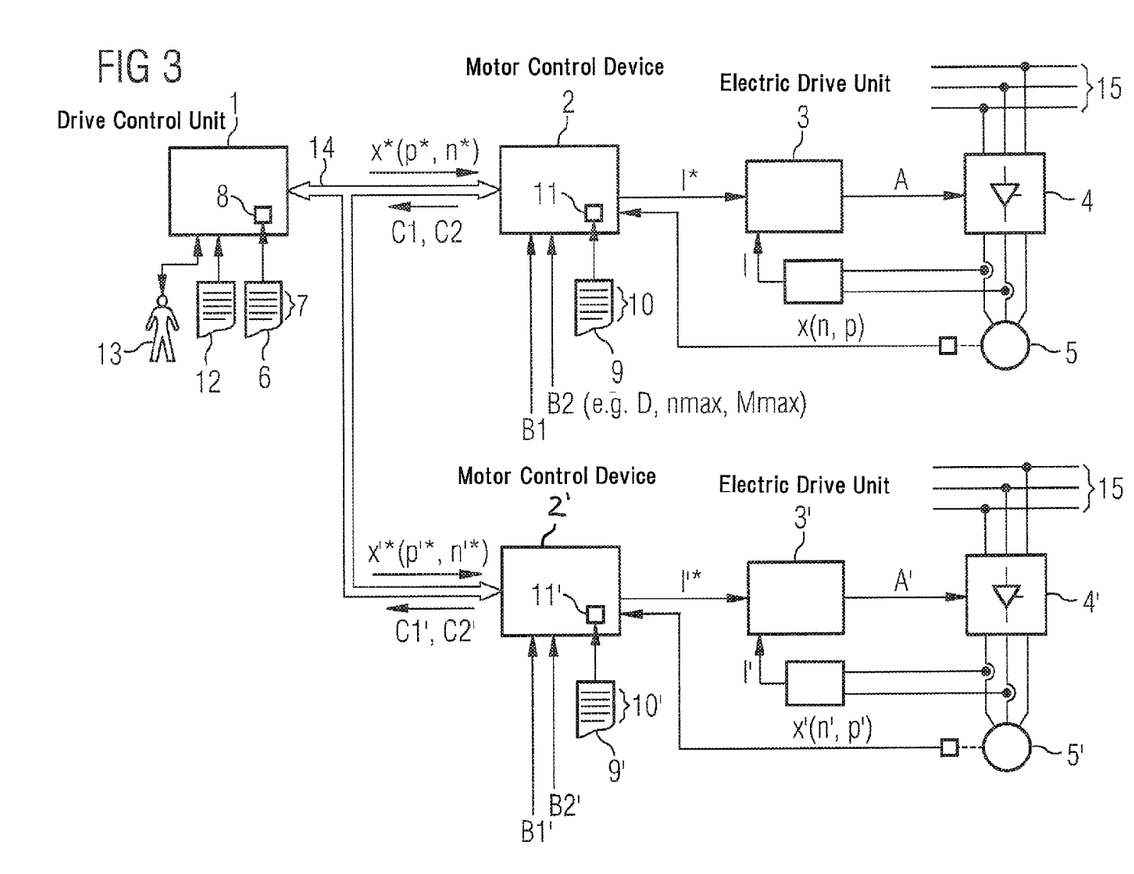

The drive control unit 1 may optionally also determine a separate sequence of setpoint values $x'^*$ each for further electric motors 5'. These setpoint values $x'^*$ may be in particular be of the same type as the setpoint values $x^*$ for the electric motor 5. They may therefore be for example likewise position setpoint values $p'^*$ or likewise rotational speed setpoint values $n'^*$. They may however also be setpoint values $x'^*$ of a different type.

Via a communication link 14 the drive control unit 1 makes each sequence of setpoint values $x^*$, $x'^*$ available to the motor control device 2 and/or 2' that acts upon the respective electric motor 5, 5', for which the respective sequence of setpoint values $x^*$, $x'^*$ is determined. If—in the case of for example two electric motors 5, 5'—the motor control device 2 acts upon both electric motors 5, 5' (see FIG. 2), both sequences of setpoint values $x^*$, $x'^*$ are made available to the motor control device 2. If different motor control devices 2, 2' act upon the electric motors 5, 5' (see FIG. 3), each sequence of setpoint values $x^*$, $x'^*$ is made available to the appropriate motor control device 2, 2'. Purely for the record, it should be mentioned at this point that the reference characters of the further components 2' to 5' that are used in FIGS. 2 and 3 correspond in each case to the components having the same reference character without "'".

The term "made available" is to be interpreted broadly. The manner in which the respective sequences of setpoint values $x^*$, $x'^*$ are made available to the motor control device 2 and/or motor control devices 2, 2' is immaterial.

The term "communication link" is also to be interpreted likewise very broadly. It is to comprise any type of link between the drive control unit 1 and the motor control device 2 and/or motor control devices 2 and 2' that may be used to effect a data exchange by time-division multiplex or bidirectionally between the drive control unit 1 and the motor control device 2 and/or motor control devices 2 and 2'. The communication link 14 may for example take the form of a serial bus or a serial point-to-point link. What is crucial is that via one and the same data channel data of differing type are transmitted (i.e. not just a sequence of identical-type data) and that the data exchange is effected bidirectionally via the data channel.

During normal operation the motor control device 2, on the basis of the sequence of setpoint values $x^*$ that is made available to it by the drive control unit 1 and of the corresponding actual value x, determines current setpoint values $I^*$ for the electric motor 5. If the motor control device 2 acts upon a plurality of electric motors 5, 5'—see FIG. 2—it determines on the basis of the corresponding sequence of setpoint values $x^*$, $x'^*$ and the respective corresponding actual values x, x' separate current setpoint values I*, I'* for each electric motor 5, 5' that it controls. The motor control device 2 makes the current setpoint values I*, I'* available to the drive units 3, 3'.

Each drive unit 3, 3', on the basis of the current setpoint values I*, I'* supplied to it and the corresponding current actual values I, I', determines trigger signals A, A' for the circuit-breakers 4, 4' and supplies the trigger signals A, A' to the circuit-breakers 4, 4'. By means of the circuit-breakers 4, 4' the corresponding electric motors 5, 5' are connected to a power supply 15.

Control of the further electric motor 5' is effected in an analogous manner even when the further electric motor 5' is controlled by means of the further motor control device 2'.

In the following only the motor control device 2 is described in detail. The explanations relating to the motor control device 2 however also apply analogously to the further motor control device 2'.

The motor control device 2 performs further tasks in addition to the function described above. This is described in detail below in conjunction with FIG. 4.

Figure 4:
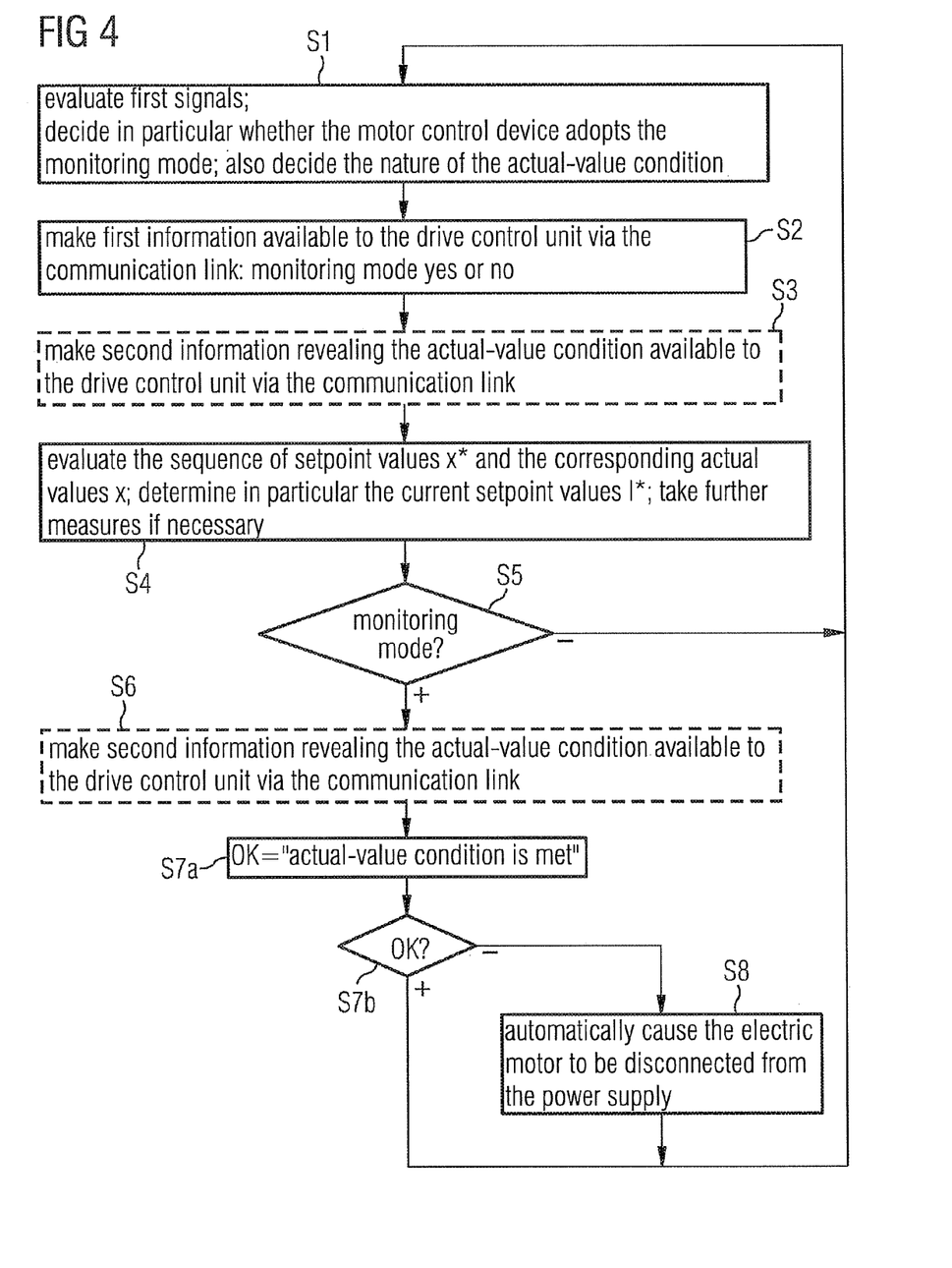

According to FIG. 4 the motor control device 2 evaluates a number of first signals B1 in a step S1. On the basis of the first signals B1 the motor control device 2 decides whether it adopts a monitoring mode. If it adopts the monitoring mode, it further decides—preferably within the step S1—the nature of an actual-value condition. The actual-value condition may be for example that the electric motor 5 is monitored for compliance with a rotational speed limit nmax and/or for compliance with a setpoint direction of rotation D.

The first signals B1, on the basis of which the motor control device 2 decides whether or not it adopts the monitoring mode, are supplied from outside to the motor control device 2. The first signals B1 may be supplied for example by means of a terminal module associated with the motor control device 2 or by means of a programmable controller via a bus link. These procedures are known in the prior art.

The actual-value condition is initially dependent upon the nature of the monitoring mode. For example, by means of the supplied first signals B1 it may be defined whether the electric motor 5 is to be monitored for compliance with a maximum permissible rotational speed nmax and/or for compliance with a predetermined direction of rotation D. The value of the direction of rotation D, i.e. for example anti-clockwise or clockwise rotation, may moreover be externally selected for the motor control device 2. Continuously variable values may also be externally selected for the motor control device 2, for example the rotational speed limit nmax or a maximum permissible torque limit Mmax. Such signals, which parameterize the actual-value condition, are referred to hereinafter as second signals B2 in order to differentiate them from the first signals B1 that initiate or terminate the monitoring mode as such.

Via the communication link 14 by which the sequence of setpoint values x* is made available to the motor control device 2 by the drive control unit 1, in a step S2 the motor control device 2 in turn makes first information C1 available. The first information C1 reveals whether the motor control device 2 is in the monitoring mode.

In a step S3 the motor control device 2 via the same communication link 14 may make second information C2 available to the drive control unit 1. The second information C2 reveals the nature of the actual-value condition.

The first information C1 and the second information C2 may optionally represent a unit. For example, by means of a single binary value it may be encoded that the electric motor 5 is to be brought to a standstill and actively held there. However, other situations are also conceivable where the first and the second information C1, C2 have to be information blocks that are separate from one another. For example, the first information C1 may signify monitoring for compliance with a rotational speed limit and the second information C2 may define the rotational speed limit nmax.

In a step S4 the motor control device 2 evaluates the sequence of setpoint values x* that is made available to it by the drive control unit 1, and the corresponding actual values x. In particular, the motor control device 2 determines the current setpoint values I*. Where necessary, the motor control device 2 within the step S4 takes further measures that are needed for correct control of the electric motor 5. For example, it may make the current setpoint values I* available to the drive unit 3 for the electric motor 5.

In a step S5 the motor control device 2 checks whether it is in the monitoring mode. If this is not the case, the motor control device returns to step S1. Otherwise, the motor control device 2 goes to a step S6.

In step S6 the motor control device 2 may—as in step S3—make the second information C2 available to the drive control unit 1 via the communication link 14. Step S6 corresponds in content to step S3. Of the steps S3 and S6, therefore, only one is required. It is therefore possible to dispense with the other of the two steps S3 and S6. For this reason, steps S3 and S6 are shown merely within a dashed line in FIG. 4.

In a step S7 the motor control device 2 checks whether the electric motor 5 meets the actual-value condition. For the sake of clarity, step S7 is split into steps S7a and S7b in FIG. 4.

If the electric motor 5 meets the actual-value condition, the motor control device 2 returns to step S1. Otherwise, the motor control device 2 goes to a step S8. In step S8 the motor control device 2 automatically causes the electric motor 5 to be disconnected from the power supply 15. This procedure is known. For example, the motor control device 2 may suppress the output of the trigger signals A to the circuit-breakers 4. It is alternatively or additionally possible for example to trigger relays or contactors, by means of which the circuit-breakers 4 are disconnected from the power supply 15. Other measures are also conceivable.

Where necessary, the motor control device 2 within the step S8 takes further measures. For example the motor control device 2 may await a reset and/or issue a message to another device, in particular to the drive control unit 1.

Figure 5:
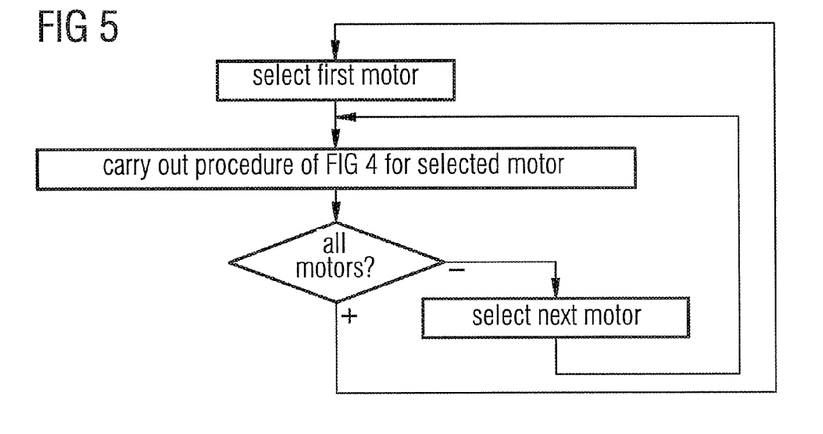

As already mentioned, it is possible for the motor control device 2 to control a plurality of electric motors 5, 5'. In this case, according to FIG. 5 the motor control device 2 executes the procedure of FIG. 4 for each electric motor 5, 5'. As the steps represented in FIG. 5 are self-explanatory, no further explanations regarding FIG. 5 are provided.

The drive control unit 1—in addition to determining the sequences of setpoint values x*, x'* and making available the sequences of setpoint values x*, x'* for the motor control device 2 (and/or the motor control devices 2, 2')—also performs further functions. This is described in detail below in conjunction with FIG. 6.

Figure 6:
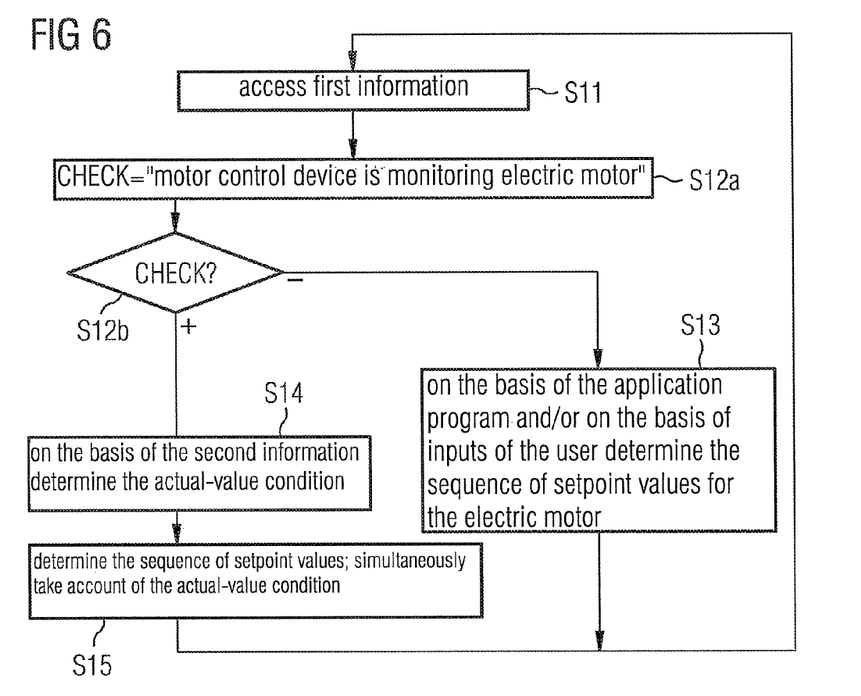

According to FIG. 6 the drive control unit in a step S11 accesses the first information C1 that has been made available to it by the motor control device 2 via the communication link 14. On the basis of the first information C1 the drive control unit 1 checks in a step S12 whether the motor control device 2 is monitoring the electric motor 5 for compliance with an actual-value condition. For the sake of clarity, step S12 is split into steps S12a and S12b in FIG. 6.

If the motor control device 2 is not monitoring the electric motor 5 for compliance with an actual-value condition, the drive control unit 1 goes to a step S13. In step S13 the drive control unit 1 determines, on the basis of the application program 12 and/or on the basis of inputs of the user 13, the sequence of setpoint values x* for the electric motor 5. From step S13 the drive control unit 1 returns to step S11.

If the motor control device 2 is monitoring the electric motor 5 for compliance with an actual-value condition, the drive control unit 1 goes from step S12 to a step S14. In step S14 the drive control unit 1 determines on the basis of the second information C2 the nature of the actual-value condition.

In a step S15 the drive control unit 1 determines the first sequence of setpoint values x* and makes it available to the motor control device 2. Step S15 corresponds substantially to step S13. In contrast to step S13, within step S15 the drive control unit 1 determines the sequence of setpoint values x* for the electric motor 5 but while simultaneously taking into account the actual-value condition determined in step S14.

In an analogous manner to the motor control device 2, the drive control unit 1 may determine the setpoint values x*, x'* for a plurality of electric motors 5, 5'. In this case, according to FIG. 7 the procedure of FIG. 6 is carried out for each electric motor 5, 5' that is controlled by the drive control unit 1. Where necessary, in so doing the drive control unit 1 takes into account any necessary coordination of the electric motors 5, 5' with one another. This implies in particular that, in the situation where the motor control device 2 is monitoring the actual value of the electric motor 5 for compliance with the actual-value condition, the sequence of setpoint values x'* for the further electric motor 5' also has to be determined while simultaneously taking into account the actual-value condition that actually applies only to the electric motor 5.

Figure 7:
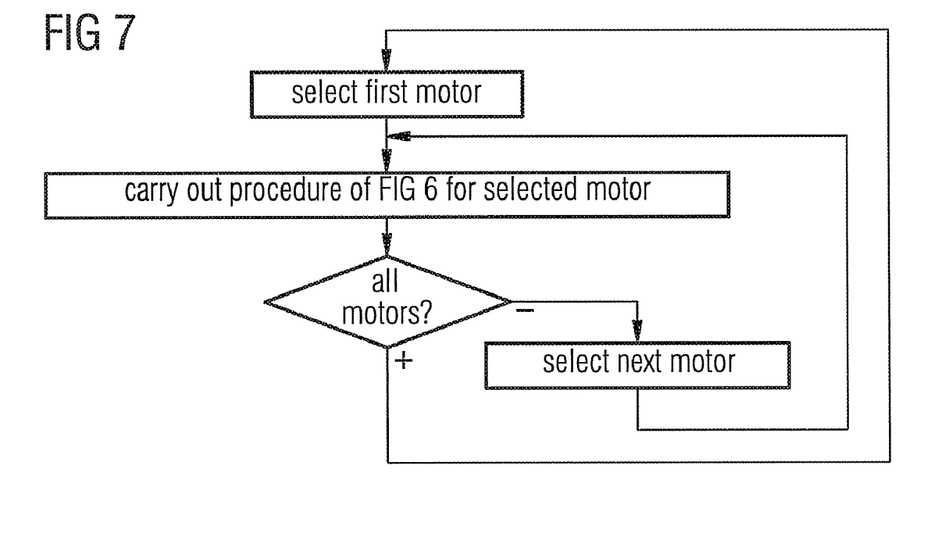

Since the procedure of FIG. 7 is otherwise self-explanatory, then—as in the case of FIG. 5—no further explanations regarding FIG. 7 are provided.

The drive control unit 1 preferably carries out motion control. The term "motion control" means that the drive control unit 1 determines the sequences of setpoint values x*, x'* for the electric motors 5, 5' in such a way that the corresponding actual values x, x' may follow the setpoint values x*, x'*. The drive control unit 1 is therefore—see FIG. 1—designed as a motion control unit for production machines. In particular, it may be designed as a numerical control unit (CNC) for machine tools.

Figure 8:
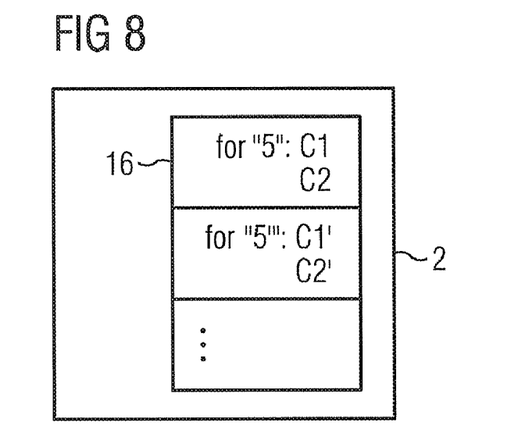

The first and the second information C1, C2—for each electric motor 5, 5' controlled by the motor control device 2—has to be stored in the motor control device 2. For this purpose the motor control device 2 according to FIG. 8 preferably stores the first and the second information C1, C2 in a contiguous data storage area 16 of the motor control device 2. In particular, in the situation where the motor control device 2 controls a plurality of electric motors 5, 5', according to FIG. 8 the first and the second information C1, C2 for each of these electric motors 5, 5' may be stored in the data storage area 16.

As already mentioned, the term "make available" is to be interpreted comprehensively. It is in particular to comprise the procedures described below.

Thus, the term is simultaneously to comprise the motor control device 2 communicating the first and the second information C1, C2 to the drive control unit 1. In this case, according to FIG. 9 a readout unit 17 of the motor control device 2—for example a microprocessor—reads out the first and the second information C1, C2 from the data storage area 16 of the motor control device 2 and communicates it to the drive control unit 1. The drive control unit 1 accepts the information C1, C2, which is communicated to it, by means of a read-in unit 18—for example likewise a microprocessor—and stores it in a data storage area 19 of the drive control unit 1. From there, the drive control unit 1 reads it out when required.

Figure 9:
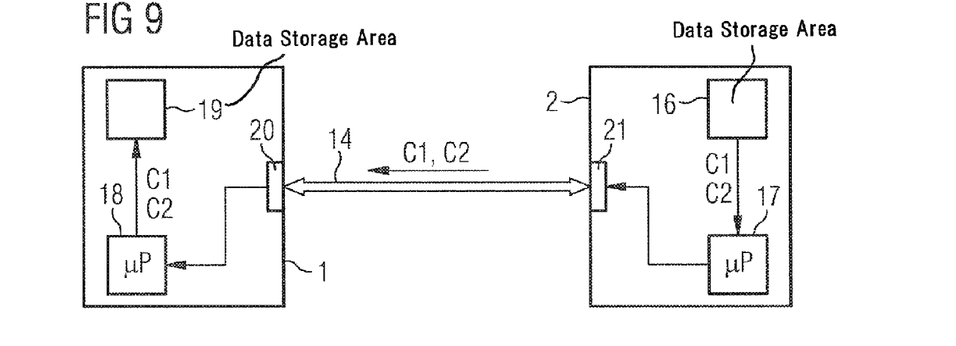

The communication of the information C1, C2 may be effected for example cyclically. It may be effected by the motor control device 2 automatically—i.e. without being initiated from outside. Alternatively, the motor control device 2 may communicate the first and the second information C1, C2 only because of an external event. Such an event may be for example that the first and/or the second information C1, C2 has changed or that the motor control device 2 has received a request (polling) for the information C1, C2 from the drive control unit 1. The polling may optionally in turn be effected cyclically.

Figure 10:
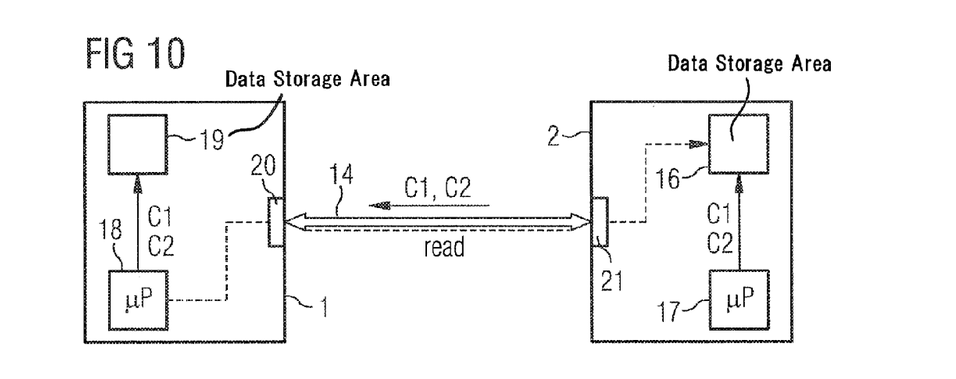

The advantage of the procedure of FIG. 9 is that neither the motor control device 2 nor the drive control unit 1 has to know where and how the first and the second information C1, C2 is stored and managed by the respective other device 2, 1. Should such knowledge simultaneously be required, as an alternative to the procedure of FIG. 9, it is possible for the motor control device 2 to allow the drive control unit 1 at least read access to the data storage area 16 of the motor control device 2. In this case, according to FIG. 10 the drive control unit 1 may directly access the data storage area 16 of the motor control device 2 and read out the first and the second information C1, C2 from there. Such procedures are known by the term DMA (direct memory access).

Figure 11:
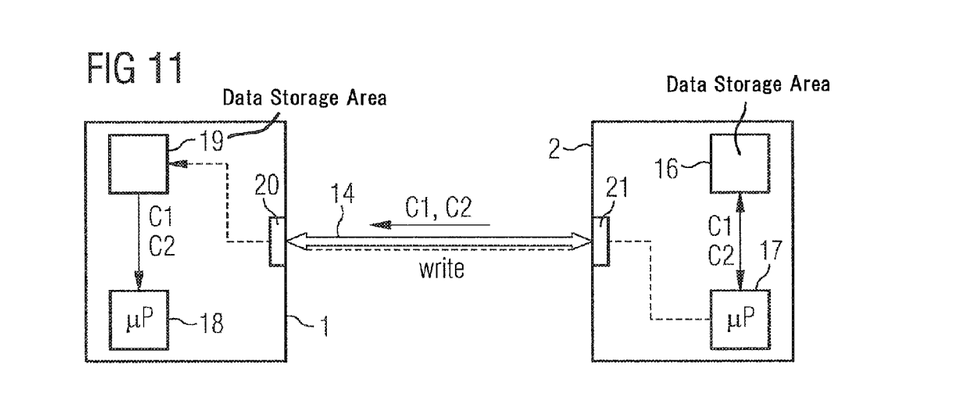

Again as an alternative, it is possible for the drive control unit 1 to allow the motor control device 2 write access to the data storage area 19 of the drive control unit 1. In this case, according to FIG. 11 it is possible for the motor control device 2 to write the first and the second information C1, C2 into the data storage area 18 of the drive control unit 1. The drive control unit 1 may read it out from there.

As explained above, the actual-value condition may be parameterizable on the basis of second signals B2 supplied from outside to the motor control device 2. It is however alternatively or additionally possible for the actual-value condition to be variable with time. This is described in detail below in conjunction with FIG. 12.

Figure 12:
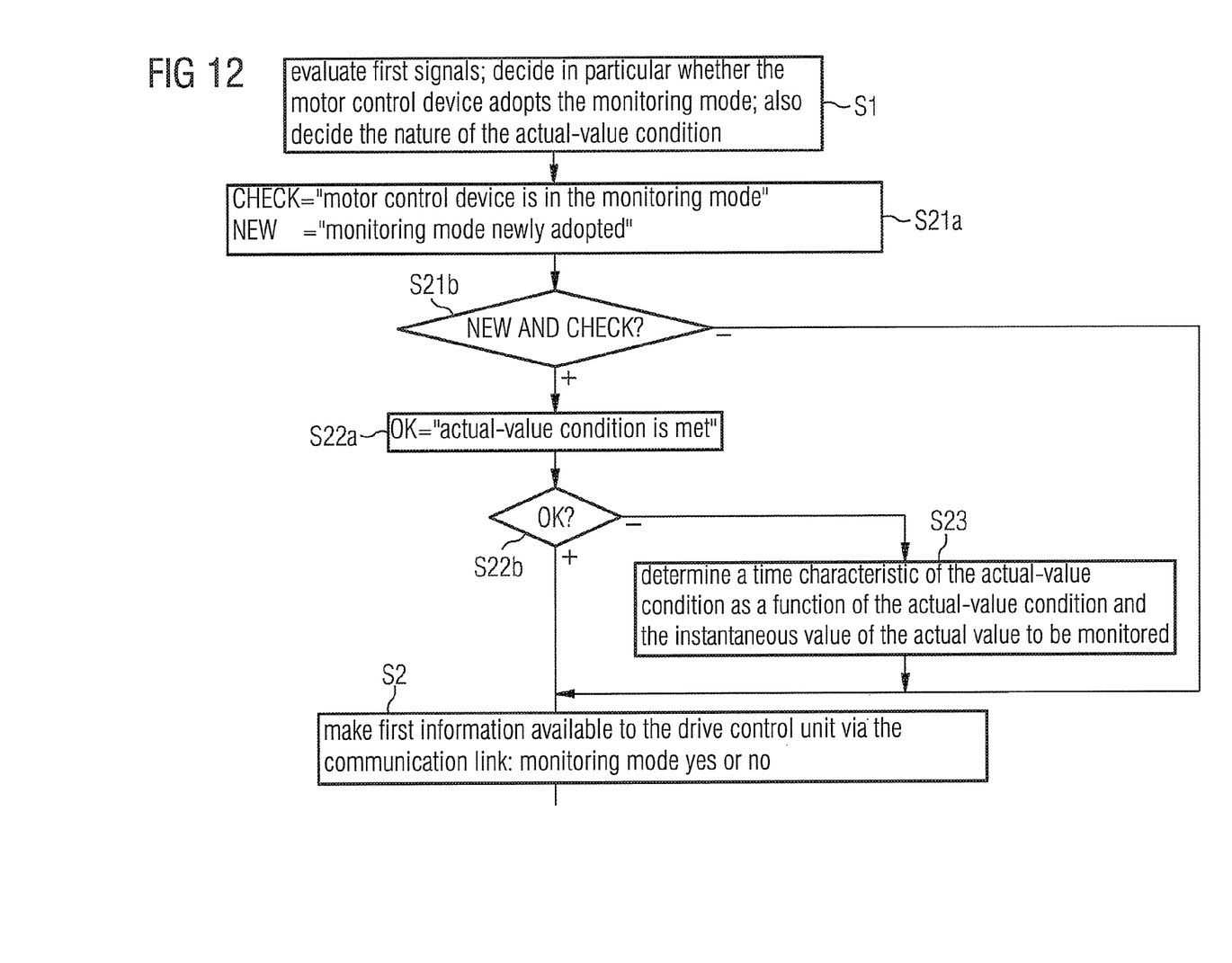

According to FIG. 12 steps S21 to S23 may be inserted between steps S1 and S2—cf. also FIG. 4. In step S21 the motor control device 2 checks whether a double condition is met. A first part of the double condition is that the motor control device 2 is in the monitoring mode. A second part of the double condition is that the monitoring mode has been newly adopted, i.e. that during the immediately preceding run through the loop of FIG. 4 the monitoring mode had not yet been adopted. If both parts of the double condition are met, the motor control device 2 goes to step S22. Otherwise, the motor control device 2 goes to step S2. For the sake of clarity, in FIG. 12 step S21 is split into two sub-steps S21a and S21b.

In step S22 the motor control device 2 checks whether the actual value of the motor 5 that is to be monitored already meets the actual-value condition determined in step S1. If so, the motor control device goes to step S2. It is only if the actual-value condition is not yet met that the motor control device 2 goes to the step S23. For the sake of clarity, in FIG. 12 step S22 is split into two sub-steps S22a and S22b.

In step S23 the motor control device 2 as a function of the actual-value condition and the present value of the actual value to be monitored—for example as a function of the deviation of the monitored actual value from a limit value to be complied with—determines a time characteristic of the actual-value condition. In this way it is possible for example to take account of the fact that a deceleration of the electric motor 5 takes a specific, not negligible time, i.e. that despite correct control of the electric motor 5 and despite a correct response of the electric motor 5 an immediate compliance with the actually desired actual-value condition is not possible.

The procedure according to the invention offers many advantages. In particular, the computer programs 6, 9 for the drive control unit 1 and the motor control device 2 may be generated independently of the programs for all other modules—for example a programmable controller. There is moreover no need for any additional cabling (or the sources of error associated therewith). For the communication link 14, by means of which the sequences of setpoint values x*, x'* are made available to the motor control device 2, is already present. The drive control unit 1 and in particular the application program 12 may also be created independently of the manner in which the first signals B1 are supplied to the motor control device 2. In the case of the procedure according to FIG. 9, there is moreover no need for the drive control unit 1 to know where and how the motor control device 2 stores the first information and the second information C1, C2.

The above description serves exclusively to explain the present invention. The protective scope of the present invention, on the other hand, is to be determined exclusively by the accompanying claims.

The invention claimed is:

1. A method of operating a drive device of an electric motor, comprising:
   determining a sequence of setpoint values for the electric motor;
   providing the drive device with the sequence of setpoint values by a higher-level drive control unit via a communication link;
   determining, based upon the sequence of setpoint values and corresponding actual values, current setpoint values for the electric motor;
   providing a drive unit of the electric motor with the current setpoint values or, based upon the current setpoint values and corresponding current actual values, determining trigger signals for a plurality of circuit-breakers, the electric motor being connected in accordance with the respective current setpoint value to a power supply via the circuit-breakers, and supplying the trigger signals to the circuit-breakers;
   deciding, based upon first signals supplied from outside to the drive device, whether an actual value of the electric motor for compliance with an actual-value condition is monitored, monitoring mode;
   causing automatically the electric motor to be disconnected from the power supply in the monitoring mode when the actual value does not comply with the actual-value condition;
   providing the drive control unit with first information revealing whether the drive device is in the monitoring mode, the first information being provided via the same communication link by which the sequence of setpoint values is provided to the drive device by the drive control unit; and
   providing the drive control with second information revealing a nature of the actual-value condition, the second information being provided at least in the monitoring mode and via the same communication link by which the drive device accepts the sequence of setpoint values from the drive control unit.

2. The method as claimed in claim 1, wherein the sequence of setpoint values is a sequence of position setpoint values or rotational speed setpoint values.

3. The method as claimed in claim 2, wherein the actual-value condition is compliance with a rotational speed limit by the electric motor and/or rotation of the electric motor in a setpoint direction of rotation.

4. The method as claimed in claim 1, wherein the actual-value condition is variable with time and/or parameterizable on the basis of second signals supplied from outside to the drive device.

5. The method as claimed in claim 1, wherein the drive device stores the first and the second information in a contiguous data storage area of the drive device.

6. The method as claimed in claim 5, wherein in the contiguous data storage area the first and the second information is stored for each of the electric motors controlled by the drive device.

7. The method as claimed in claim 5, wherein the drive device allows the drive control unit at least read access to the contiguous data storage area.

8. The method as claimed in claim 1, wherein the drive device transmits the first and the second information to the drive control unit.

9. The method as claimed in claim 1, wherein the drive device writes the first and the second information into a contiguous data storage area of the drive control unit.

10. A drive device of an electric motor, wherein the drive device is operated as follows:
   based upon a sequence of setpoint values, which is determined for the electric motor and provided to the drive device by a higher-level drive control unit via a communication link, and corresponding actual values, the drive device determines current setpoint values for the electric motor and either provides the current setpoint values to a drive unit of the electric motor or, based upon the current setpoint values and corresponding current actual values determines trigger signals for a plurality of circuit-breakers, the electric motor being connected by the circuit-breakers in accordance with the respective current setpoint value to a power supply, and supplies the trigger signals to the circuit-breakers;
   based upon first signals supplied from outside to the drive device, the drive device decides whether it is monitoring an actual value of the electric motor for compliance with an actual-value condition, monitoring mode;
   in the monitoring mode, the drive device automatically causes the electric motor to be disconnected from the power supply when the actual value does not comply with the actual-value condition;
   the drive device, via the same communication link by which the sequence of setpoint values is provided to the drive device by the drive control unit, provides to the drive control unit first information, which reveals whether the drive device is in the monitoring mode; and
   at least in the monitoring mode the drive device, via the same communication link by which the drive device accepts the sequence of setpoint values from the drive control unit, provides to the drive control unit second information, which reveals the nature of the actual-value condition.

11. The drive device as claimed in claim 10, wherein the sequence of setpoint values is a sequence of position setpoint values or rotational speed setpoint values.

12. The drive device as claimed in claim 11, wherein the actual-value condition is compliance with a rotational speed limit by the electric motor and/or rotation of the electric motor in a setpoint direction of rotation.

13. A drive control unit, which is operated as follows:
on the basis of an application program and/or on the basis of inputs of a user, the drive control unit determines a first sequence of setpoint values for at least a first electric motor;
the drive control unit via a communication link makes at least the first sequence of setpoint values available to a first lower-level drive device;
the drive control unit on the basis of first information, which is made available to the drive control unit by the first drive device via the same communication link, by which the drive control unit makes the first sequence of setpoint values available to the first drive device, checks whether the first drive device is monitoring an actual value of the first electric motor for compliance with an actual-value condition;
if the first drive device is monitoring the actual value of the first electric motor for compliance with the actual-value condition, the drive control unit initially on the basis of second information, which is made available to the drive control unit by the first drive device via the same communication link, by which the drive control unit makes the first sequence of setpoint values available to the first drive device, determines the nature of the actual-value condition and then determines the first sequence of setpoint values while simultaneously taking account of the actual-value condition.

14. The drive control unit as claimed in claim 13, wherein the first sequence of setpoint values is a sequence of position- or rotational speed setpoint values.

15. The drive control unit as claimed in claim 14, wherein the actual-value condition is compliance with a rotational speed limit by the first electric motor and/or rotation of the first electric motor in a setpoint direction of rotation.

16. The drive control unit as claimed in claim 13, wherein on the basis of an application program and/or on the basis of inputs of the user, the drive control unit determines a second sequence of setpoint values for at least a second electric motor,
the second sequence of setpoint values is of the same type as the first sequence of setpoint values,
the drive control unit makes the second sequence of setpoint values available either to the first drive device or to a second drive device and
in the situation where the first drive device is monitoring the actual value of the first electric motor for compliance with the actual-value condition, the drive control unit determines the second sequence of setpoint values while simultaneously taking account of the actual-value condition.

17. The drive control unit as claimed in claim 13, wherein the drive control unit reads out the first and the second information from a contiguous data storage area of the drive device.

18. The drive control unit as claimed in claim 13, wherein the drive control unit accepts the first and the second information from the drive device.

19. The drive control unit as claimed in claim 13, wherein the drive control unit allows the drive device write access to a contiguous data storage area of the drive control unit and the drive control unit reads out the first and the second information from the contiguous data storage area.

20. The drive control unit as claimed in claim 13, wherein the drive control unit is designed as a motion control unit for production machines, in particular as a numerical control unit for machine tools.

* * * * *